3,178,638
APPARATUS FOR MAGNETICALLY TESTING
A MOVING STEEL STRIP
Frank F. Cilyo, Franklin Township, Westmoreland
County, Pa., assignor to United States Steel Corporation, a corporation of New Jersey
Filed Oct. 26, 1960, Ser. No. 65,229
3 Claims. (Cl. 324—34)

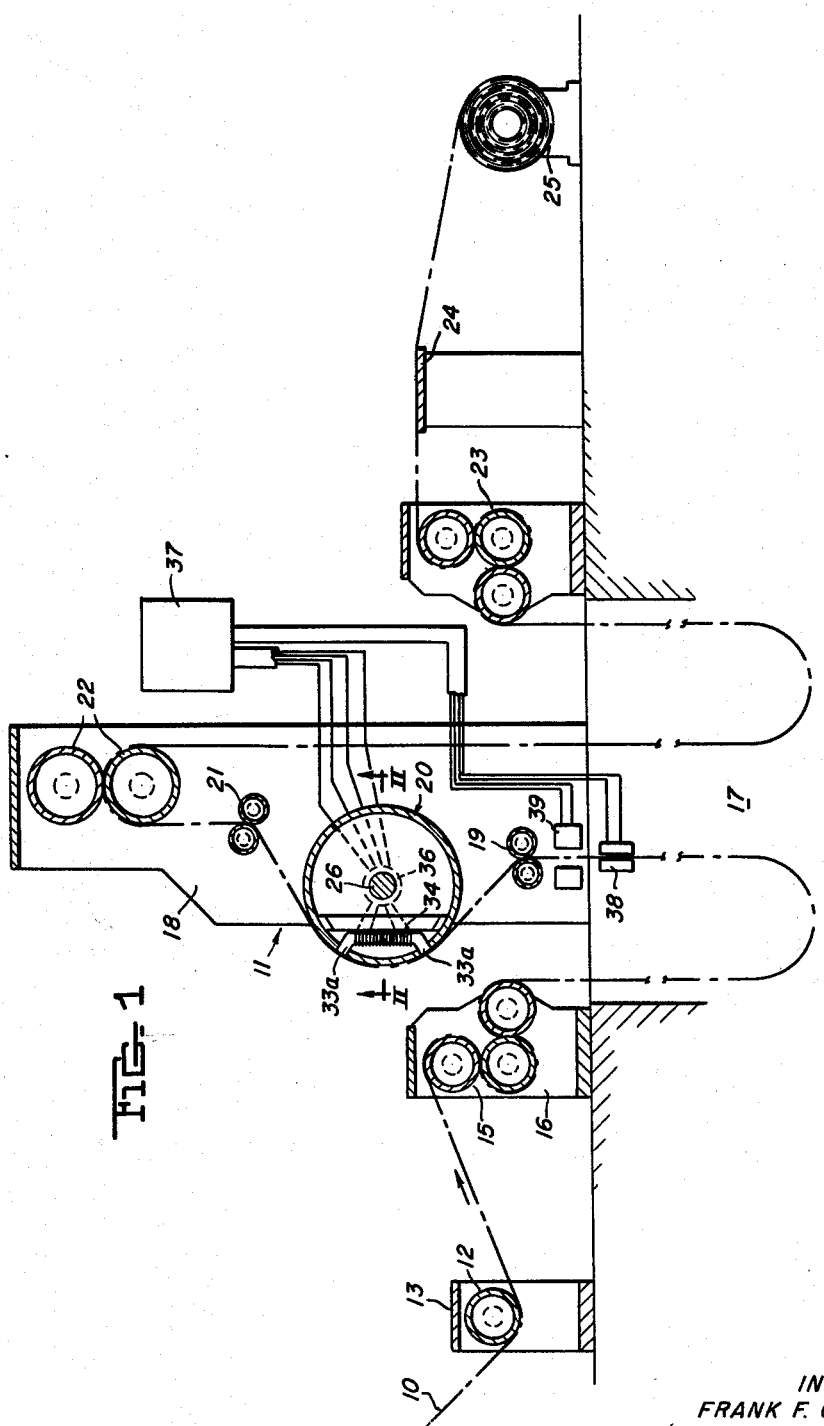

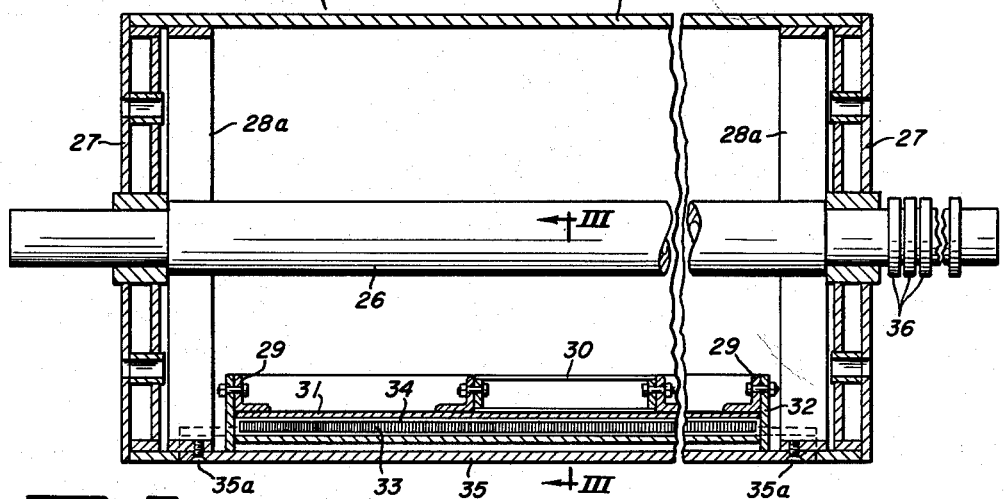
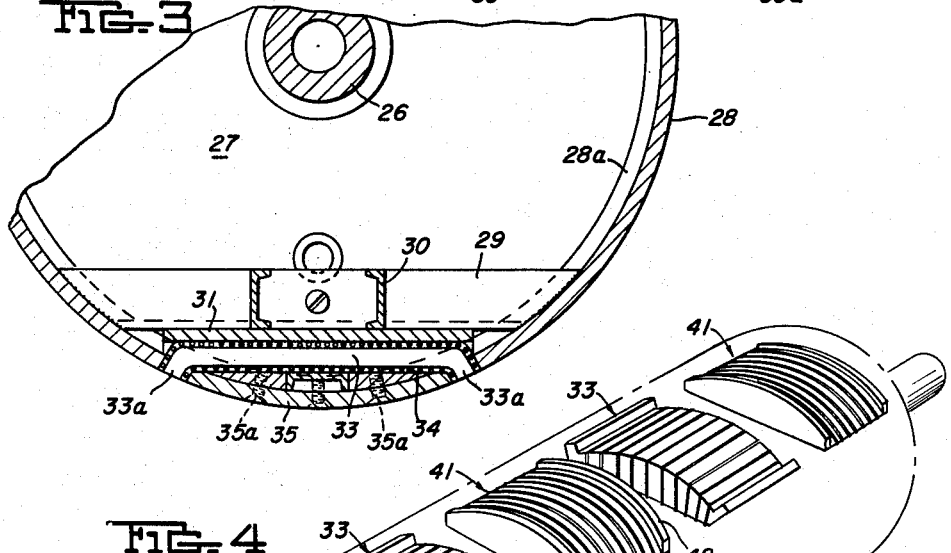
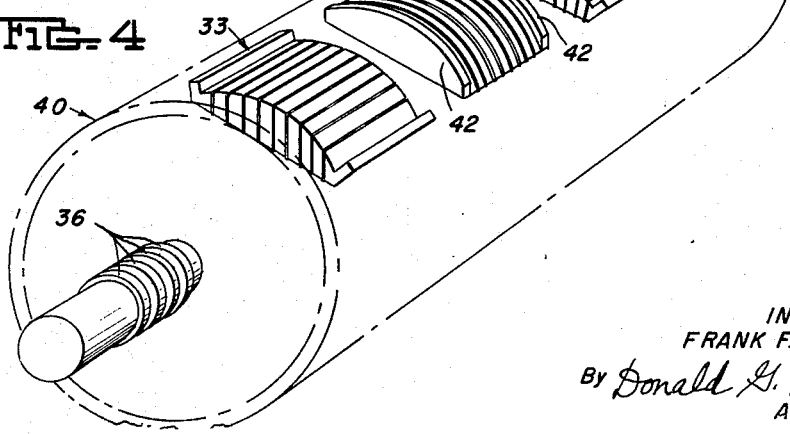
INVENTOR
FRANK F. CILYO
By Donald G. Dalton
Attorney

United States Patent Office 3,178,638
Patented Apr. 13, 1965

This invention relates to apparatus for the measurement of the electrical properties (core loss, permeability, etc.) of sheet steel while in the form of a continuous strip and traveling at high speed.

The quality and salability of "electrical sheets" are largely dependent on their magnetic properties but the latter cannot be determined by known means until the processing of the material has been completed. The object of the invention, therefore, is to provide a means for and method of measuring the magnetic properties of steel strip while it is in process. Thus, if such properties do not meet the required values, the possibility remains open for further processing or reprocessing to make the properties conform to the desired standards. A further object is to provide apparatus for the purpose specified which is compact, relatively inexpensive and accurate in measurement.

I have invented apparatus for repeatedly bringing a magnetic yoke briefly into magneto-inductive relation with successive portions of the strip spaced along the length thereof, while it is moving. By suitable circuit connections to exciting and induction coils wound around the yoke, the magnetic properties of successive areas along the length of the strip may be accurately measured. If such properties are found to deviate from the range required, corrective measures may be taken or a complete reprocessing initiated if necessary.

More particularly, I mount a drum or cylinder in the path of traveling strip so the latter may be trained therearound and fit the yoke in the cylinder so that on each rotation of the cylinder caused by engagement of the strip therewith, the yoke will come into magneto-inductive relation to a portion of the strip area. Thus a magnetic measurement may be made without any destructive or adverse effect on the strip or necessitating a stoppage or slow-down in its travel. This measurement may be combined with other physical (dimensional) qualities to determine core loss, permeability, etc.

A complete understanding of the invention may be obtained from the following detailed description and explanation which refer to the accompanying drawings illustrating the present preferred embodiment. In the drawings:

FIGURE 1 is a central longitudinal section through an apparatus for carrying out my method;

FIGURE 2 is an axial sectional view of the cylinder, taken along the plane of line II—II of FIGURE 1;

FIGURE 3 is a partial cross-section through the cylinder, taken along the plane of line III—III of FIGURE 2; and FIGURE 4 is a partial perspective skeleton view of a modified form of cylinder.

Referring now in detail to the drawings and, for the present to FIGURE 1, a length of strip 10 of electrical steel is passed through a magnetic measurement line indicated as a whole at 11. This line may be located at the exit end of continuous annealing apparatus (not shown). The strip passes first under a guide roller 12 journaled in a frame or housing 13 and is then trained around the rollers of a driven traction-bridle 15 journaled in a frame 16. From bridle rollers 15, the strip is fed into a looping pit 17 and next ascends a magnetic-measurement housing 18.

In its ascent through housing 18, the strip first passes between guide rollers 19 and thence partially around a magnetic-measurement cylinder 20 journaled in the housing. From cylinder 20, the strip passes between guide rollers 21 and a pair of pinch rolls 22. On emerging from rolls 22, the strip again enters the looping pit 17 and is drawn therefrom by a second driven traction bridle 23. From the bridle 23, the strip passes over a stationary guide bar 24 and is recoiled by a coiler 25.

The cylinder 20 is shown in greater detail in FIGURES 2 and 3. A shaft 26 is journaled in suitable bearings in the side plates of housing 18 and has a pair of spaced discs 27 mounted thereon. These discs support a cylindrical shell plate 28 subtending an angle of about 300°, and having end rings 28a therein. Chordal struts 29 extend across the open space or slot between the edges of plate 28 and stays 30 extends between adjacent struts. A bearing plate 31 secured to the struts and stays defines the bottom of a segmental pocket in the cylinder and plate sgements 32 secured to the struts adjacent discs 27 form the ends thereof.

A laminated magnetic yoke 33 having pole pieces 33a and excitation and induction windings 34 thereon is removably positioned against plate 31 and is secured in position by a filler segment 35. Screws 35a hold segment 35 to end rings 28a. Shell plate 28 is made from non-magnetic metal as are also struts 29, stays 30, plate 31 and segment 35. Connections are made from windings 34 to slip rings 36 mounted on shaft 26 but insulated therefrom. The necessary circuits extend therefrom via the usual brushes and stationary conductors.

It will be evident from the foregoing that, as strip 10 is drawn upwardly through housing 18, cylinder 20 will be frictionally driven thereby. Each time the yoke 33 comes into magneto-inductive relation with an area of the strip as shown in FIGURE 1, an opportunity is afforded for a determination by any suitable instrumentation, such as a computer indicated diagramatically at 37, of the magnetic properties of that area. By thus repeatedly determining the properties of successive areas, any trend away from specified ranges may be noted and corrected. A width gage 38 and a thickness gage 39 of known types may be connected to computer 37 in order to obtain an indication of core loss in watts per pound.

FIGURE 4 shows a modified form of cylinder 40, generally similar to that shown at 20, except that it has a plurality of yokes 33 spaced therealong. It also has yokes 41 similarly mounted thereon. These yokes are like yokes 33 except that they are turned 90°, i.e., the pole pieces 42 of the yokes are spaced axially of the cylinder instead of circumferentially as in case of yokes 33. Yokes 41 thus permit measurement of the magnetic properties transversely of the strip in addition to the measurement of the properties longitudinally of the strip made by yokes 33.

It will be evident from the foregoing that the invention provides simple and inexpensive means affording a continuous indication of the magnetic properties of a length of steel strip at spaced points therealong while the strip is traveling through a processing line. This permits a continuous check on results and an adjustment of the processing conditions to give more exact control of the properties of the finished product.

Although I have disclosed herein the preferred embodiment of my invention, I intended to cover as well any change or modification therein which may be made without departing from the spirit and scope of the invention.

I claim:

1. Apparatus for magnetically testing a steel strip while in motion comprising means for conveying the strip longitudinally along a predetermined path, a cylinder journaled transversely of said path with its periphery adjacent thereto, said cylinder having a slot in its circumference extending axially thereof, chordal struts extending across said slot in spaced relation along said cylinder, a magnetic yoke seated in said slot bearing against said struts, said yoke having pole pieces extending generally radially of said cylinder, so as to be brought into proximity with the strip repeatedly on rotation of the cylinder, and excitation and induction windings on said yoke.

2. Apparatus as defined in claim 1, characterized by a filler segment overlying said yoke.

3. Apparatus as defined in claim 1, characterized by one of said pole pieces being disposed at each side of said slot.

References Cited in the file of this patent
UNITED STATES PATENTS

| | | |
|---|---|---|
| 2,179,240 | Breitenstein | Nov. 7, 1939 |
| 2,223,371 | Keevil | Dec. 3, 1940 |
| 2,719,949 | McMaster | Oct. 4, 1955 |
| 2,817,808 | Gieske | Dec. 24, 1957 |
| 2,970,256 | Sazynski et al. | Jan. 31, 1961 |
| 3,012,233 | Greanias et al. | Dec. 5, 1961 |
| 3,091,733 | Fearon et al. | May 28, 1963 |